United States Patent
Zinke et al.

(10) Patent No.: US 7,468,950 B2
(45) Date of Patent: Dec. 23, 2008

(54) COMMUNICATION NETWORK AND METHOD OF CONTROLLING THE COMMUNICATION NETWORK

(75) Inventors: Manfred Zinke, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 424 days.

(21) Appl. No.: 10/555,833

(22) PCT Filed: May 4, 2004

(86) PCT No.: PCT/IB2004/001364

§ 371 (c)(1),
(2), (4) Date: Nov. 7, 2005

(87) PCT Pub. No.: WO2004/100449

PCT Pub. Date: Nov. 18, 2004

(65) Prior Publication Data
US 2007/0041482 A1 Feb. 22, 2007

(30) Foreign Application Priority Data
May 8, 2003 (EP) ................................ 03101272

(51) Int. Cl.
*H04J 3/14* (2006.01)
*H04J 3/06* (2006.01)

(52) U.S. Cl. ...................................... 370/252; 370/509
(58) Field of Classification Search .................. None
See application file for complete search history.

(56) References Cited

U.S. PATENT DOCUMENTS

| | | | |
|---|---|---|---|
| 6,619,451 B2 * | 9/2003 | Hrazdera | 192/3.58 |
| 6,942,595 B2 * | 9/2005 | Hrazdera | 477/37 |
| 2005/0141565 A1 * | 6/2005 | Forest et al. | 370/503 |
| 2005/0243715 A1 * | 11/2005 | Rausch et al. | 370/217 |

OTHER PUBLICATIONS

TTP: "Drive by Wire" in greifbarer Nähe [TTP: Drive by wire within reach], Dr Stefan Polenda, Georg Kroiss; "Elektronik" No. 14, 1999.
TTP: "A Time-Triggered Protocal for Fault-Tolerant Real-Time" H. Kopetz and G. Grunsteidl. pp. 524-533.
TTP: "A Time-Triggered Protocal for Fault-Tolerant Real-Time" H. Kopetz and G. Grunsteidl. pp. 524-533 (1993).

* cited by examiner

*Primary Examiner*—Andrew Lee

(57) ABSTRACT

The invention relates to a communication network with at least two network nodes, with transmission channels for transmitting data packets between the network nodes, and with at least one active coupler. The invention provides for coupler information to be attached to the data packets as they pass through the active coupler, and data-packet running-time information to be determined from the coupler information in a network node that receives a data packet.

18 Claims, 3 Drawing Sheets

COMMUNICATION NETWORK AND METHOD OF CONTROLLING THE COMMUNICATION NETWORK

The invention relates to a communication network and a method of controlling the communication network. A communication network of this kind is known from, for example, *TTP: "Drive by Wire" in greifbarer Nähe* [TTP: Drive by wire within reach], Dr Stefan Polenda, Georg Kroiss; "Elektronik" No. 14, 1999, p. 36 to 43.

For distributed real-time computer systems of this kind, such as are used in the automobile industry, for instance, time-triggered communication protocols such as TTP or FlexRay have gained acceptance. The media access protocol is hereby based on a statistical communication time schedule defined a priori during the system design. Defined in this schedule for each communication node is the time at which it is allowed to send data within a communication cycle.

In many networks of this kind, the time at which messages arrive at the receiving node is important for certain global synchronization tasks, such as clock synchronization. If delays occur during the transmission of the message, they have to be allowed for in the receiving node.

In addition to bus topologies, star topologies are increasingly being used in many communication networks. Depending on the complexity of the network, multiple star arrangements are also customary. Using active network couplers, these networks may be structured in such a way that only "point-to-point" connections exist between network couplers and network nodes or between two network couplers. By comparison with passive star points or bus topologies, this enables better defined line terminations and thereby higher data rates.

It is an object of the invention to create a communication network and a method related to this that enables an improved synchronization of the network nodes.

This object is achieved in accordance with the invention by a communication network with at least two network nodes, with at least one transmission channel for transmitting data packets between the network nodes, and with at least one active coupler, wherein coupler information is attached to the data packets as they pass through the active coupler, and data-packet running-time information is determined from the coupler information in a network node that receives a data packet.

The invention is based on the idea of providing an item of coupler information to a data packet that is passing through an active coupler in a network, enabling conclusions to be drawn about the running time of the data packet. Hereby exploited is the fact that, in networks with active couplers, the delays that arise when passing through an active coupler are generally greater than the delays that arise as a result of electrical or optical lines. This applies to a particular extent to optical networks, in which the active couplers cause especially long delays as a result of conversion between optical and electrical signals.

An active coupler is deemed to be a coupler that routes a signal arriving at an input interface to at least one output interface by means of active switching elements.

The coupler information may contain very simple, but also complex, information.

In a preferred embodiment of the invention as claimed in claim 2, an item of counting information relating to the number of active couplers passed through is added to the data packets as coupler information. This may take place in binary form. Counting information of this kind enables detection of the fact that the data packet has passed through an active coupler. If a data packet passes through multiple active couplers, each of these couplers independently adds counting information to the data packet. This preferred embodiment of the invention has the particular advantage that the active couplers of a communication network of this kind can be realized simply and cost-effectively, and do not require an own processor.

In the case of networks with active couplers, these active couplers make a significant contribution to the delay of the data packets, so the running-time delay of the data packet can be determined as running-time information from the number of active couplers participating in the transmission. To this end, it is sufficient to know, in the receiving node, the typical delay of an active coupler and the number of couplers involved in the transmission. The running-time delay to be taken into account can be determined directly from this with very little effort. Storage of running-time delays for the individual transmission paths between the network nodes is not necessary. Expensive storage space is hereby saved. In addition, the network characterization, which takes place in advance and possibly without a precise knowledge of the wiring, can be simplified. Short-term changes to the network topology, such as those arising as a result of the drop-out of an active coupler in networks with built-in redundancy, can also be taken into account during operation as a result.

Alternatively, with the advantageous embodiment of the invention as claimed in claim 3, the coupler information may be identification information, which unambiguously identifies a particular coupler passed through. Unambiguous identification information is more complex than simple counting information. The active coupler therefore has to be provided with more intelligence. On the other hand, however, the entire transmission path of the data packet can be unambiguously determined in a node that receives a data packet.

The advantageous embodiment of the invention as claimed in claim 4 relates to a distributed communication system in which time slots for the transmission are assigned to the individual network nodes. Access to the transmission channels thus takes place in accordance with a cyclical time division method (TDMA). In order that the access can be controlled accordingly, the communication controllers of the network nodes are equipped with local time schedulers. These may be local oscillator circuits, for instance. In order to synchronize the time bases of the individual local time schedulers, the times at which data packets arrive are compared in the receiving node with the associated anticipated times, which derive from the local time-conception of the receiving node. Correction terms are formed from these differences in all network nodes and these are used to synchronize the local time-conceptions with one another.

By contrast with conventional systems, in which only a fixed, previously-configured running time can be allowed for, the synchronization of the local time schedulers is considerably improved by means of the evaluation of the running-time information for the data packets in the receiving nodes. Especially in communication systems with redundant transmission paths within a transmission channel, abrupt changes in the running time may occur on drop-out of an active coupler. With the method in accordance with the invention, theses changes in running time are detected in the receiving node, and do not lead to any impairment of the clock synchronization.

Overall, a higher precision of the global clock synchronization can be realized.

With the advantageous embodiment of the invention as claimed in claim 5, the network nodes are equipped with a memory in which an associated running-time delay is stored for the particular number of active coupler passed through.

In this advantageous embodiment of the invention, with this configuration of the network, the necessary information regarding the anticipated running-time delays for the individual transmission channels may be stored in, for example, a Table in each network node. Using this supplementary information, a receiving node can then determine, from the number of active couplers transmitted with the data packet, the data packet running-time delay that has occurred. This enables an especially precise determination of the running-time delay.

With the advantageous embodiment of the invention as claimed in claim 6, the network nodes are equipped with a monitoring circuit for detection of the drop-out of redundant transmission paths. In the case of redundant networks, abrupt changes in the running-time delay may occur on drop-out of an active coupler. This can be detected and allowed for by the monitoring circuit arranged in the receiving node. If the transmission path changes as a result of the drop-out of a component, the number of participating active couplers may also change. This is noted by the receiving node and can be passed on as error information. Should the number of active couplers involved in the transmission of a data packet not change as the result of the drop-out of a component, the receiving node concerned cannot, of course, note this drop-out.

Since, however, the data packet is also transmitted to other network nodes, it is ensured that, in all cases, the drop-out will be noted by one of these network nodes. The running-time delay associated with the changed transmission path may, for instance, also be stored a priori in the network nodes, and may, if required, be used for synchronization purposes. Depending on the network topology and influence of the lines on the overall running time of the data packet, it is possible that the running-time information for the individual transmission paths stored in the network nodes will represent only approximation values. It is, nevertheless, possible in this manner to compensate, at least in part, the abrupt change to the running time of a data packet resulting from the drop-out of an active coupler. Faults in the global clock synchronization can thereby be reduced or prevented entirely.

With the advantageous embodiment of the invention as claimed in claim 7, at least one star coupler is provided as the active coupler with at least three star interfaces. The star interfaces of the star coupler are each provided in order to route a data packet, as a function of an activation signal, from the assigned network node to the other star interfaces.

A star coupler of this kind does not require an expensive processor. Accordingly, a network with star couplers of this kind can be realized cost-effectively. However, a special activation signal, for instance a pilot reference, a symbol sequence preceding the message or a signal edge clearly added before the message, is necessary in addition to the transmitted message.

With the advantageous embodiment of the invention as claimed in claim 8, the data packets are equipped with an identification section, in particular a preamble. The network nodes are furthermore equipped to add to the data packets the coupler information by means of a change to the identification section.

This represents an especially simple opportunity for adding coupler information to the data packets. A circuit configuration for changing the identification section can be implemented with little outlay in the individual active couplers. A solution of this kind can be used with particular advantage in the case of communication networks equipped with an active star coupler as claimed in claim 7. A circuit that is present in any event for detection of the activation signal can then, with slight adjustments, also take on the addition of the coupler information.

The identification section may, for instance, also be added at the end of the data packet in the form of an annex. Further, the identification section could also be located in a reserved section within the data packet. Especially suited for this are parts of the data packet that are needed only in specific phases, e.g. on startup.

With the advantageous embodiment of the invention as claimed in claim 9, the identification section of the data packet is equipped with an equisignal. This may be, for instance, a d.c. voltage signal, but also a d.c. current signal. The active couplers are each provided in order to add the coupler information by changing the length of the identification section.

With the advantageous embodiment of the invention as claimed in claim 10, the identification section is equipped with a number of pulses. The active couplers are provided in order to add the coupler information by changing the number of pulses.

The coupler information in the identification section can, however, also take a different form. The identification section may, for instance, generally comprise a sequence of symbols, separated from one another by pauses.

In order to add the coupler information on passing through an active coupler, a filter circuit with properties matched to the length of these symbols and the pauses is added to the active couplers. Using this filter, symbols already present are detected and it is only at the end of the symbol sequence that a further symbol is added. Alternatively, the symbol sequence may be generated in the transmitting node and the first symbol in each case may be removed from the symbol sequence by a filter in each active coupler. In addition, the symbol sequence may comprise, for instance, a sequence of periodic edge changes. A filter circuit in the active network couplers removes a known number of periods. In the receiving node, the number of remaining periods is counted.

The invention further relates to a motor vehicle as claimed in claim 11 and a method as claimed in claim 12.

The invention will be further described with reference to examples of embodiments shown in the drawings, to which, however, the invention is not restricted.

Figure 1:
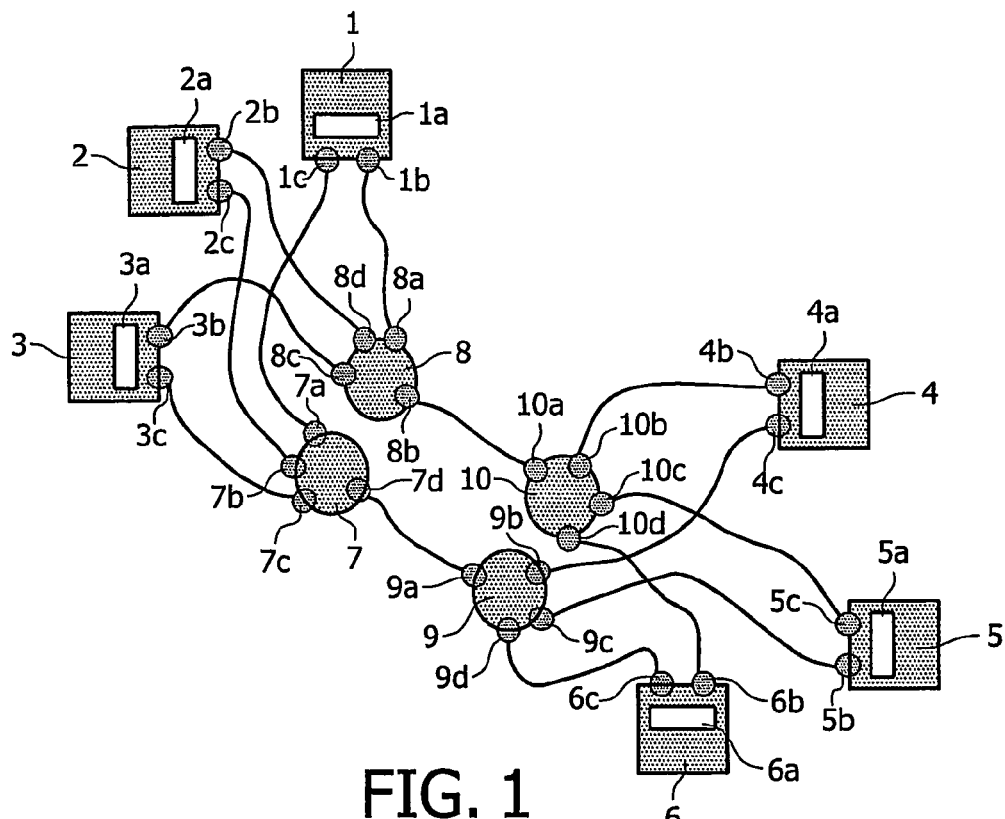
FIG. 1 shows a communication network in accordance with the invention.

FIG. 1 shows a communication network with six network nodes 1 to 6. The communication network as shown in FIG. 1 may preferably be a bus system of a motor vehicle. The six network nodes 1 to 6 may be, for instance, individual electrical components of a motor vehicle. The network nodes 1 to 6 are each equipped with communication controllers 1*a* to 6*a*.

As the interface with the transmission channels, the six network nodes 1 to 6 are each equipped with two bus drivers 1*b*, 1*c* to 6*b*, 6*c*. Each of the six network nodes 1 to 6 is therefore equipped with two interfaces with the bus system, and is therefore redundantly connected to the bus system.

The network is equipped with four active network couplers 7, 8, 9 and 10. The active network couplers 7, 8, 9 and 10 are, in this example, each equipped with four star interfaces 7a, 7b, 7c, 7d to 10a, 10b, 10c and 10d. The active couplers 7 to 10 are internally wired, in a manner that is not shown, such that a signal arriving at one of the star interfaces is routed to all the other star interfaces of the active coupler. As a result, the data packets to be transmitted via the network are distributed star-wise over the network. The data packets to be transmitted via the network do not, therefore, have to exhibit any routing information.

A more detailed design of active couplers of this kind is described in, for example, EP 1 085 705 A2. The active couplers may, in particular, be of the same design as the coupler disclosed in FIG. 3 of EP 1 085 705 A2.

Figure 2:
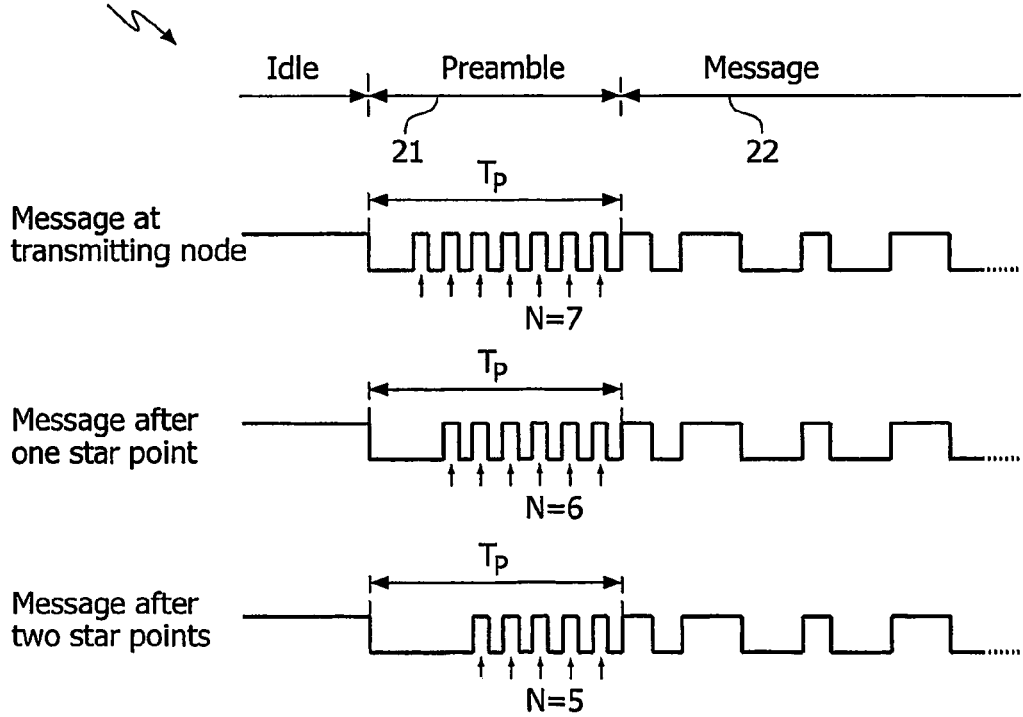
FIG. 2 shows the waveform over time of a data packet equipped with an identification section with a number of pulses.

FIG. 2 shows a first embodiment example of the waveform over time of a data packet 20. As its identification section, the data packet 20 exhibits a preamble 21, which precedes a message section 22 with the actual user data. The preamble 21 comprises a pulse sequence preceding the message section 22, which pulse sequence is generated in, for instance, the particular transmitting network nodes. The active couplers 7 to 10 as shown in FIG. 1 are each equipped with a circuit, not shown, which removes the first pulse of this pulse sequence. Otherwise, the data packets 20 are routed unchanged by the active couplers 7 to 10 from the input interface to the other interfaces. If the data packet 20 passes through a further active coupler, the first pulse of the remaining pulse sequence is again suppressed. This principle is repeated in further active couplers until the data packet 20 has arrived in the particular receiving network node.

The receiving network node now determines from the number of remaining pulses, by comparison with the known, original number, the number of active couplers passed through.

Since, in the communication network as shown in FIG. 1, the active couplers 7 to 10 make a significant contribution to the delay of the data packets to be transmitted between the network nodes 1 to 6, the running-time delay of the received data packets can be determined, as running-time information, in network nodes 1 to 6 from the number of active couplers involved in the transmission. To this end, it is sufficient for the typical delay of an active coupler to be stored in the network nodes 1 to 6. Then, the running-time delay to be allowed for can be determined directly from the number of couplers involved in the transmission.

The communication network shown in FIG. 1 is a distributed communication system in which time slots for the transmission of data packets are allotted to the individual network nodes 1 to 6. Access to the individual transmission channels between the network nodes 1 to 6 thereby takes place in accordance with a cyclical time division method (TDMA). In order that access can be controlled accordingly, the communication controllers 1a to 6a of the network nodes 1 to 6 are equipped with local time schedulers, which are not shown. These may be, for instance, local oscillator circuits. In order to synchronize the time bases of the individual local time schedulers, in addition to the arrival times of the data packets, the running-time delay determined in the individual network nodes 1 to 6 on receipt of a data packet is evaluated and used for synchronization of the local time schedulers. An improved global clock synchronization can be realized as a result.

Figure 3:
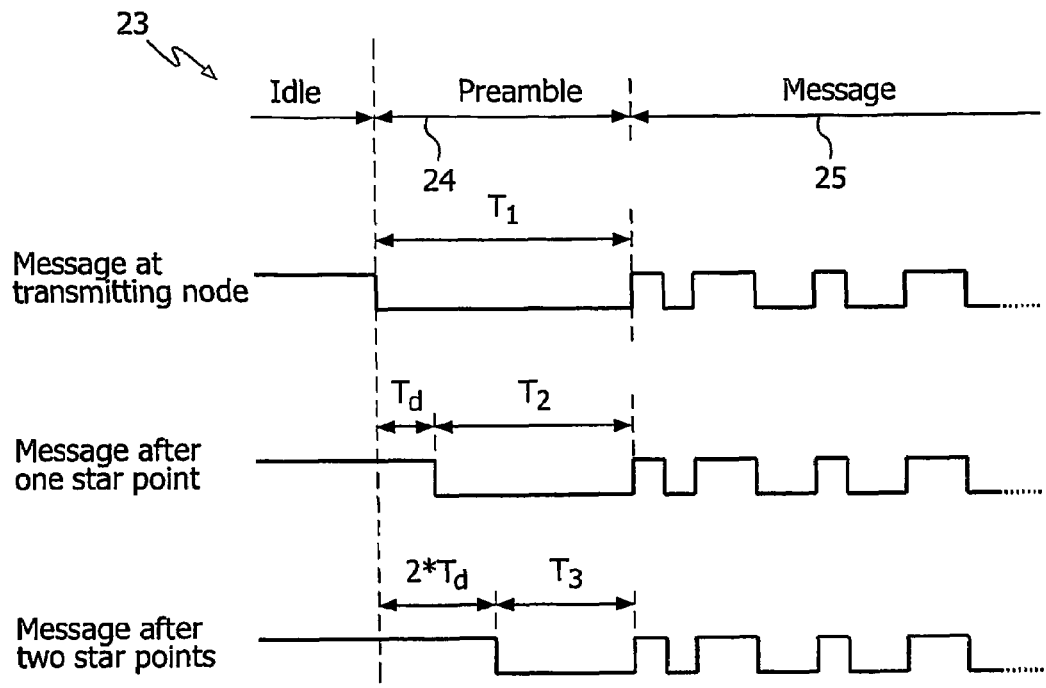
FIG. 3 shows the waveform over time of a data packet equipped with an identification section with a d.c. voltage signal.

FIG. 3 shows a second embodiment example of the waveform over time of a data packet 23. In this embodiment example, the data packet comprises a preamble 24 and a message section 25. The preamble 24 comprises a d.c. voltage signal. The length of the d.c. voltage signal is reduced in each active coupler by a quantity $T_d$ that can be predetermined. In the receiving network node, the length of the received preamble 24 is measured and, by comparison with the original length, the number of active couplers passed through is determined.

The way in which a circuit that is generally present in active couplers for activity detection can also be used for adding coupler information to a data packet is described below. In this example, the length of the d.c. voltage signal of the preamble 24 of the data packet 23 as shown in FIG. 3 is reduced, in each case, on passing through an active coupler.

Figure 4:
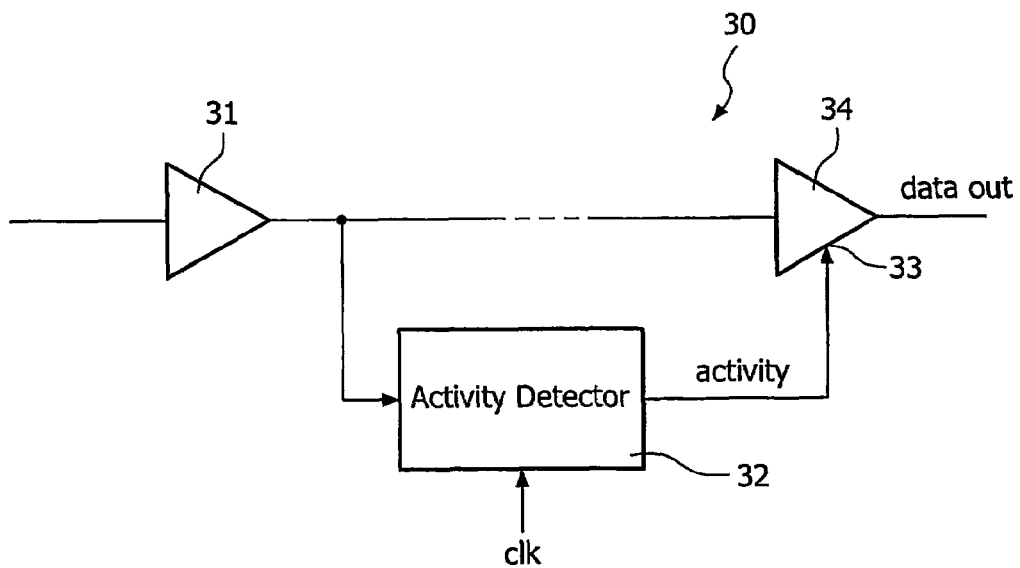
FIG. 4 shows a schematic representation of the components provided for signal routing in an active coupler.

FIG. 4 shows, schematically, the components of an active coupler 30 that are necessary for this. The active coupler 30 is equipped on the input side with an amplifier 31. The output of the amplifier 31 is coupled to an activity-detector circuit 32 for detecting an activation signal. The output of the activity-detector circuit 32 is coupled to the control input 33 of an output driver 34. The output of the amplifier 31 is coupled to the input of the output driver 34.

After amplification by the amplifier 31, the data packet received at a star interface of the active coupler 30 is sent to the activation-detector circuit 32, which generates a control signal "activity". Control of whether the output driver 34 is to place the received data packet or the idle level on the output line "data out" of the other star interfaces is by means of this control signal.

One important property of the activation-detector circuit 32 derives from the requirement for suppression of short interference pulses, which must not lead to detection of activity on one of the star interfaces during the idle phase. The activation-detector circuit 32 is therefore equipped with a low-pass filter, not shown, which suppresses interference pulses with a maximum length of $t_{noise\_max}$. This low-pass filter ensures that activity is not detected until after a delay time $t_{act\_det}$, so the output driver 34 too can be activated only after this delay. Likewise, a certain time $t_{idle\_det}$ passes at the end of the message section before the signal "activity" again becomes inactive. This time is governed by the maximum length of a 1 or 0 sequence in the message section of the data packet, and is generally independent of $t_{act\_det}$.

Figure 5:
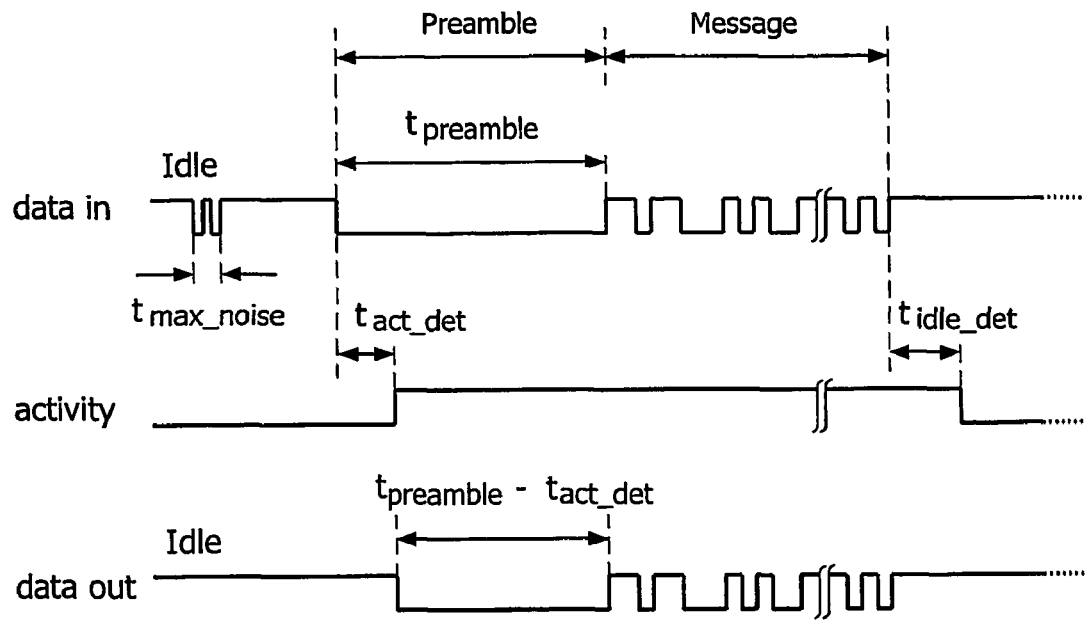
FIG. 5 shows the waveform over time of a data packet at the input and output of an active coupler and an activation signal provided for activation of the coupler.

FIG. 5 shows the waveform over time of the signals described.

Without the preceding preamble, the delayed activation of the output driver 34 would cause the start of the message section of a data packet to be corrupted. In the embodiment shown in FIG. 5, on the other hand, only the duration of the preamble is reduced by the delay time $t_{act\_det}$. This reduction takes place in every active coupler through which the message passes. In the transmitting node, therefore, the original length of the preamble $t_{preamble}$ is selected such that the message section of the data packets is not corrupted even when passing through the maximum possible number of active couplers.

The described reduction of the preamble can be used to add to the data packets, as coupler information, counting information indicating the number of active couplers through which the data packet in question has passed. To this end, a constant value, known in the receiving node, should be ensured for $t_{act\_det}$ in all active couplers. This can be achieved, for instance, if the (not shown) low-pass filter is realized as a digital filter with a clock frequency precisely defined by, for instance, a quartz oscillator. The receiving node determines the remaining length of the preamble $t_{preamble} - k*t_{act\_det}$ and can, by comparison with the original length, determine the number k of active couplers passed through.

Figure 6:
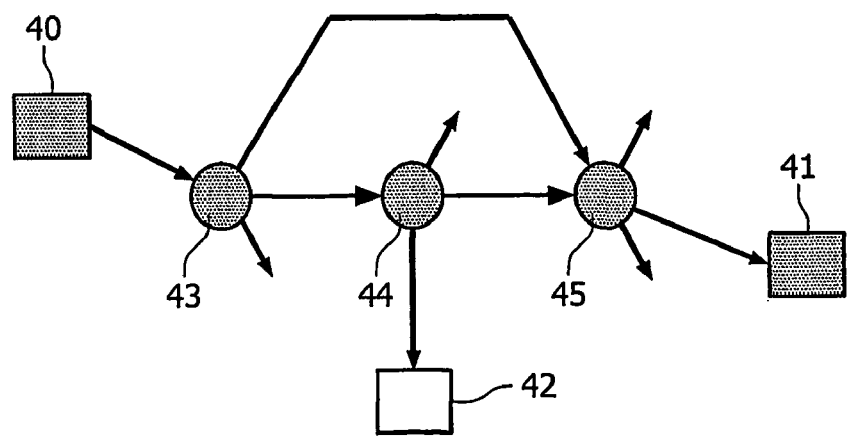
FIG. 6 shows a further communication network in accordance with the invention.

FIG. 6 shows, schematically, greatly simplified, a communication network with three network nodes 40, 41 and 42. The communication network shown in FIG. 6 may, preferably, be a bus system of a motor vehicle. The three network nodes 40, 41 and 42 may be, for example, individual electrical components of a motor vehicle.

The communication network shown in FIG. 6 is equipped with three active couplers 43, 44 and 45. The three active couplers 43, 44 and 45 are wired internally, in a manner not shown, such that a signal arriving at one of the star interfaces is routed to all the other star interfaces of the particular active coupler. As a result, the data packets to be transmitted via the network are distributed star-wise over the network. The data packets to be transmitted via the network therefore do not have to be equipped with routing information.

The network node 40 is connected to the active coupler 43. The active coupler 43 is connected to the active coupler 44, and the active coupler 44 is connected to the active coupler 45. The active coupler 45 is connected to the network node 41, and the active coupler 44 is connected to the network node 42. In addition, there exists a connection between the active coupler 43 and the active coupler 45.

The transmission channel between the network nodes 40 and 42 thereby exhibits two redundant transmission paths. The normal transmission path between the network node 40 and the network node 42 runs via the active couplers 43 and 44. If the connection between the active coupler 43 and the active coupler 44 fails or is interrupted, the transmission of a data packet between the network node 40 and the network node 42 takes place via the active coupler 43, the active coupler 45 and the active coupler 44. The transmission between the network nodes 40 and 42 therefore normally takes place via two active couplers and, in case of error, on interruption of the connection between the active coupler 43 and the active coupler 44, via three active couplers.

On interruption of the connection between the active coupler 43 and the active coupler 44, an abrupt change takes place in the running time of the transmission channel between the network node 40 and the network node 42. This can be detected in the network node 42 using the coupler information, and can be taken into account for the clock synchronization. No impairment of clock synchronization therefore takes place as a result of the failure of the connection between the active coupler 43 and the active coupler 44.

The invention claimed is:

1. A communication network with at least two network nodes, with at least one transmission channel for transmitting data packets between the network nodes, and with at least one active coupler, wherein coupler information is attached to the data packets as they pass through the active coupler, and data-packet running-time information is determined from the coupler information in a network node that receives a data packet, and the network node uses the data-packet running-time information to facilitate synchronization between clocks of the network nodes.

2. A communication network as claimed in claim 1, characterized in that an item of counting information relating to the number of active couplers passed through is added to the data packets as coupler information.

3. A communication network as claimed in claim 1, characterized in that identification information, which unambiguously identifies a particular active coupler passed through, is added to the data packets as coupler information.

4. A communication network as claimed in claim 1, characterized in that the network nodes are equipped with a memory in which an associated running-time delay is stored for a particular number of active coupler passed through.

5. A communication network as claimed in claim 1, characterized in that the network nodes are each equipped with a monitoring circuit for detection of the drop-out of transmission paths, wherein, if the running time of a received data packet differs from the running time normal hitherto, the monitoring circuit detects the drop-out of a transmission path.

6. A communication network as claimed in claim 1, characterized in that at least one star coupler is provided as the active coupler with at least three star interfaces, that the star interfaces of the star coupler are each provided in order to route a data packet, as a function of an activation signal, from the assigned network node to the other star interfaces or from one of the other star interfaces to at least one of the assigned network nodes.

7. A communication network as claimed in claim 1, characterized in that the data packets are equipped with an identification section, in particular a preamble, and that the active couplers are equipped to add the coupler information to the data packets by changing the identification section.

8. A communication network as claimed in claim 7, characterized in that the identification section is equipped with an equisignal, in particular a d.c. voltage signal, and that the active couplers are each provided in order to add the coupler information by changing the length of the equisignal.

9. A communication network as claimed in claim 7, characterized in that the identification section is equipped with a number of pulses and that the active couplers are provided in order to add the coupler information by changing the number of pulses.

10. A vehicle with a communication network as claimed in claim 1.

11. A communication network comprising: at least two network nodes, at least one transmission channel for transmitting data packets between the network nodes, and at least one active coupler that attaches coupler information to the data packets as they pass through the active coupler, wherein data-packet running-time information is determined from the coupler information in a network node that receives a data packet, characterized in that a communication time schedule is provided, which assigns to the individual network nodes time slots for the transmission of the data packets, that the network nodes are each equipped with at least one communication controller with a local time scheduler for controlling the access of the network nodes to the transmission channels in accordance with the communication time schedule, and that the running-time information for the data packets determined in the receiving nodes is used to improve the synchronization of the local time schedulers.

12. A communication network as claimed in claim 11, further comprising a plurality of active couplers, wherein the coupler information attached to the data packets as they pass though a particular one of the active couplers unambiguously identifies the particular one of the active coupler passed though.

13. A communication network as claimed in claim 11, further comprising a plurality of active couplers, wherein the network nodes are each equipped with a memory in which an associated running-time delay is stored for each of the active couplers.

14. A communication network as claimed in claim 11, wherein the data packets are each equipped with a preamble, and the active coupler is equipped to add the coupler information to the data packets by changing the preambles.

15. A communication network as claimed in claim 11, wherein the network nodes are each equipped with a monitoring circuit for detecting drop-out of transmission paths in the communication network, the monitoring circuit detecting the drop-out of a transmission path responsive to data-packet running-time information of a received data packet.

16. A method of controlling a communication network with at least two network nodes, with at least one active coupler and with at least one transmission channel for transmitting data packets between the network nodes, the method comprising: attaching coupler information to the data packets as they pass through the active coupler, determining data-packet running-time information from the coupler information in a network node that receives a data packet, and using the data-packet running-time information to facilitate synchronization between clocks of the network nodes.

17. An active coupler for a network with at least two network nodes, wherein the active coupler is provided in order to attach to data packets as they pass through the active coupler, coupler information that enables data-packet running-time information to be determined in a network node that receives a data packet and that enables the network node that receives the data packet to facilitate synchronization between clocks of the network nodes responsive to the determined data-packet running-time information.

18. A network node for a communication network, wherein the network node is provided in order to determine, on receipt of a data packet, data-packet running-time information from coupler information attached to the data packet as it passes through an active coupler and to use the data-packet running-time information to facilitate synchronization between clocks of network nodes of the communication network.

* * * * *